US007003152B1

(12) United States Patent
Sawada

(10) Patent No.: US 7,003,152 B1
(45) Date of Patent: Feb. 21, 2006

(54) IMAGE PROCESSING APPARATUS

(75) Inventor: Kenichi Sawada, Toyohashi (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 563 days.

(21) Appl. No.: 09/484,540

(22) Filed: Jan. 18, 2000

(30) Foreign Application Priority Data

Jan. 20, 1999 (JP) .................................. 11-011443
Mar. 10, 1999 (JP) .................................. 11-062584

(51) Int. Cl.
*G06K 9/00* (2006.01)
(52) U.S. Cl. ...................................... 382/167; 358/521
(58) Field of Classification Search ........ 358/518–540; 382/162–167
See application file for complete search history.

(56) References Cited

U.S. PATENT DOCUMENTS

| 4,700,399 | A |   | 10/1987 | Yoshida |          |
|-----------|---|---|---------|---------|----------|
| 4,725,966 | A |   | 2/1988  | Darby et al. |     |
| 5,357,353 | A | * | 10/1994 | Hirota  | 358/530  |
| 5,361,147 | A | * | 11/1994 | Katayama et al. | 358/532 |
| 5,430,557 | A | * | 7/1995  | Tamura et al. | 358/530 |
| 5,726,780 | A |   | 3/1998  | Hirota et al. |   |
| 5,742,410 | A | * | 4/1998  | Suzuki  | 38/518   |
| 5,850,293 | A | * | 12/1998 | Suzuki et al. | 358/529 |
| 5,909,505 | A |   | 6/1999  | Katayama et al. |   |
| 6,088,130 | A | * | 7/2000  | Matsukubo | 358/529 |

FOREIGN PATENT DOCUMENTS

| JP | 61-1171    | 1/1986  |
|----|------------|---------|
| JP | 1-264847   | 10/1989 |
| JP | 1-264847 A | 10/1989 |
| JP | 4-19072    | 2/1992  |
| JP | 4-40074    | 2/1992  |
| JP | 8-18812    | 1/1996  |

* cited by examiner

Primary Examiner—Jingge Wu
(74) Attorney, Agent, or Firm—Morrison & Foerster LLP

(57) ABSTRACT

An image processing apparatus includes an edge detecting portion for detecting an edge area of an input image signal and a lightness and chroma detecting portion for detecting a low lightness and low chroma area of the input image signal. An image processing such as edge emphasizing is performed for the edge area of black letters or lines decided by the detection signals of the edge detecting portion and the chroma detecting portion. The image processing apparatus further includes an edge enlarging portion 6 for enlarging the edge area detected by the edge detecting portion 4 and circuits 12 and 19 for converting color image data C, M and Y and black image data K so that C, M and Y color densities in the enlarged edge area is decreased and a black densities is increased. Thus, supporting a high definition, color drift in the edge portions of the black letters or lines of the color image becomes inconspicuous, so that the reproducing quality is improved.

29 Claims, 10 Drawing Sheets

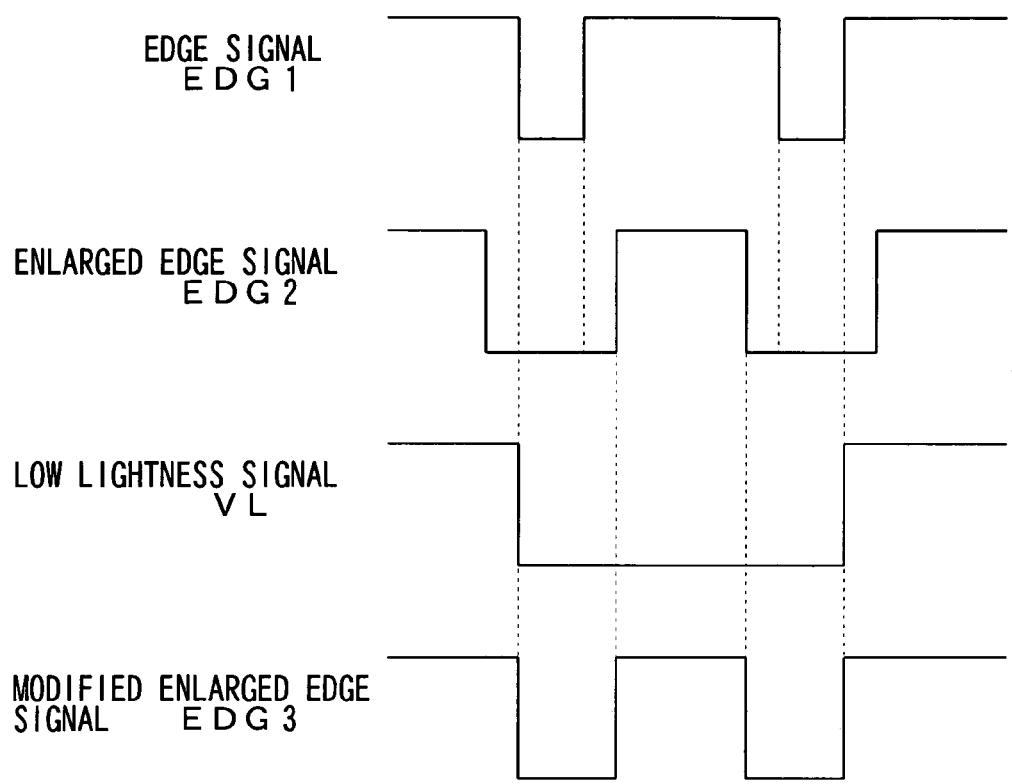

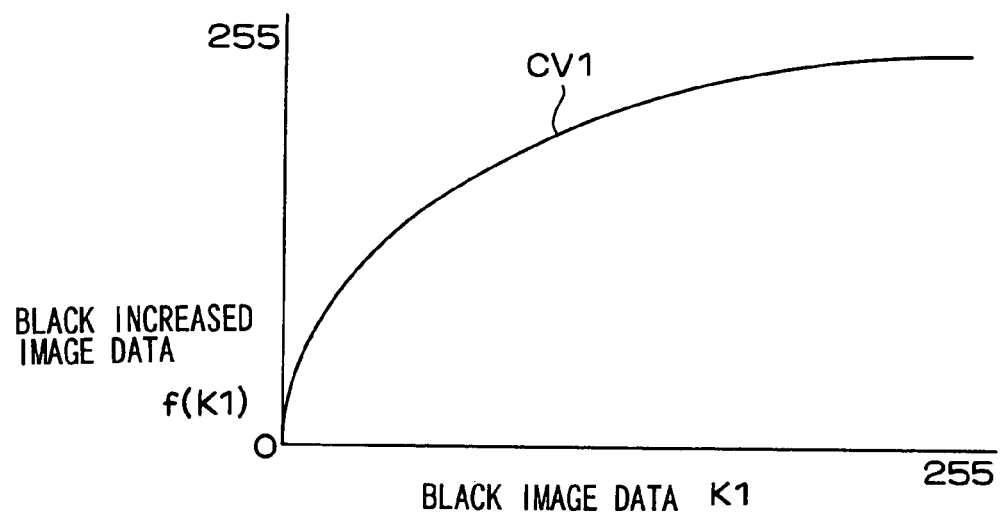
Fig. 7
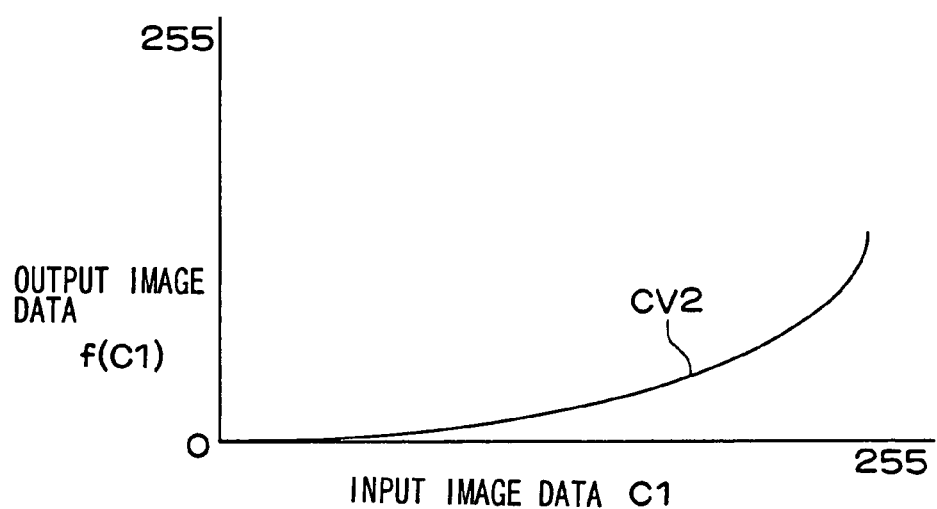

IMAGE PROCESSING APPARATUS

This application is based on Japanese Patent Application No. 11443/1999 filed on Jan. 20, 1999, No. 62584/1999 filed on Mar. 10, 1999, the contents of which are incorporated herein by reference.

BACKGROUND OF THE INVENTION

1. Field of the Invention

The present invention relates to an image processing apparatus that is mounted in a color copying machine or other equipment. More specifically, the present invention relates to an image processing apparatus that can improve reproducing quality of black letters or lines in a color image.

2. Description of the Prior Art

In the conventional image processing apparatus, in order to improve a reproducing quality of black letters or lines included in a color image, a portion of the black letters or lines in an original image is determined by area determining process, and an image processing such as edge emphasis is performed in accordance with the determination result. The image processing will be explained below.

First, the original image is read so as to obtain an input image signal, which passes a first order differential filter and a second order differential filter for extracting edge portions in the original image. In addition, low chroma areas of the input image signal are extracted. In accordance with the extraction result, black letters or lines of the original image and contours thereof are determined. It is determined whether a point is outside the edge (on the background) or inside the edge (on the black line) in accordance with the polarity of the output of the second order differential filter. Hereinafter, the outside of the edge is referred to as an outer black edge portion, while the inside of the edge is referred to as an inner black edge portion. Contours of the black letters or lines in the original image are recognized as inner black edge portions and outer black edge portions.

Next, in order to improve the reproducing quality of the black letters or lines, the following processes are performed for the inner black edge portions and outer black edge portions independently.

For pixels of the inner black edge portion, edge emphasizing process is performed, in which a lightness edge component (VMTF) is added to image data of a black component. For image data C (cyan), M (magenta) and Y (yellow) of color components, the edge emphasizing process is not performed, but another process is performed in which the image data of the referred pixel is replaced with the image data of the minimum value (i.e., the image data of the minimum density) in 5×5 or 3×3 pixel matrix.

For pixels of the outer black edge portion, the edge emphasis is not performed for any of image data K, C, M and Y of black and color components, but another process is performed in which the image data of the referred pixel is replaced with the image data of the minimum value in 5×5 or 3×3 pixel matrix.

The above-mentioned process suppress the color components C, M and Y in the neighborhood of the edges of the black letters or lines in the original image, and emphasize the inner black edge, so that the reproducing quality of the black letters or lines can be improved.

However, along with a recent high definition of the image reader, the conventional image processing explained above is not sufficient for suppressing color drift and improving the reproducing quality of the black letters or lines.

In an electrophotographic printer or other equipment, a color drift can be generated due to a misregistration of colors C, M, Y and K when overlaying the colors for printing. This color drift is relieved by the above-mentioned process that replaces the image data of the colors C, M and Y of the inner black edge with the minimum value in the matrix. When using a 5×5 pixel matrix for example, the densities of the colors C, M and Y are suppressed by the width of two pixels. Therefore, in the case of a printer that can print by a definition of 400 dpi for example, if a color drift (a misregistration between images C, M and Y) more than 128 microns that corresponds to the width of two pixels is generated, the effect of relieving the color drift by the above-mentioned process is reduced, and colors of C, M and Y can smears at the edge of the black letters or lines.

If the size of the image processing matrix (matrix size) is enlarged in accordance with a high definition, the above-mentioned process can be performed by a sufficient width for the color drift quantity, so that the problem of smearing of the colors C, M and Y at the edge of the black letters or lines can be solved. However, in this case, a capacity of memory necessary for storing the image data will also increase along with the increase of the matrix size, and the cost will increase substantially.

SUMMARY OF THE INVENTION

The object of the present invention is to provide an image processing apparatus that can support a high definition with an inexpensive and simple configuration and can improve a reproducing quality of black letters or lines.

According to the preferred embodiment of the present invention, the image processing apparatus includes an edge detecting portion for detecting an edge area in an input image and a lightness and chroma detecting portion for detecting a low lightness and low chroma area of the input image. The image processing apparatus performs an image processing (such as edge emphasizing) for the edge area of black letters or lines decided by the detection signals of the edge detecting portion and the chroma detecting portion. The image processing apparatus includes an edge enlarging portion for enlarging the edge area detected by the edge detecting portion, and means for increasing or decreasing a density of each color in the enlarged edge area. According to this process, a color drift in the edge portions becomes inconspicuous, so that the reproducing quality of the black letters or lines is improved.

According to a more preferable embodiment, the image processing apparatus includes an edge enlarging portion for enlarging the edge area detected by the edge detecting portion, and means for converting image data of each color component so that densities of color components in the enlarged edge area, e.g., a densities of color components C, M, Y are decreased, and a density of a black component, e.g., a density of color component B is increased.

Other objects and features of the present invention will be understood more clearly by referring the following description and drawings.

BRIEF DESCRIPTION OF THE DRAWINGS

FIG. 5 shows a diagram showing waveforms of an input signal, internal signals and an output signal of an edge canceling portion of the image processing apparatus shown in FIG. 1.

FIG. 6 is a graph showing a conversion characteristic of a black emphasizing circuit of the image processing apparatus shown in FIG. 1.

FIG. 7 is a graph showing a conversion characteristic of a color weakening circuit of the image processing apparatus shown in FIG. 1.

DESCRIPTION OF THE PREFERRED EMBODIMENTS

First Embodiment

Figure 1:
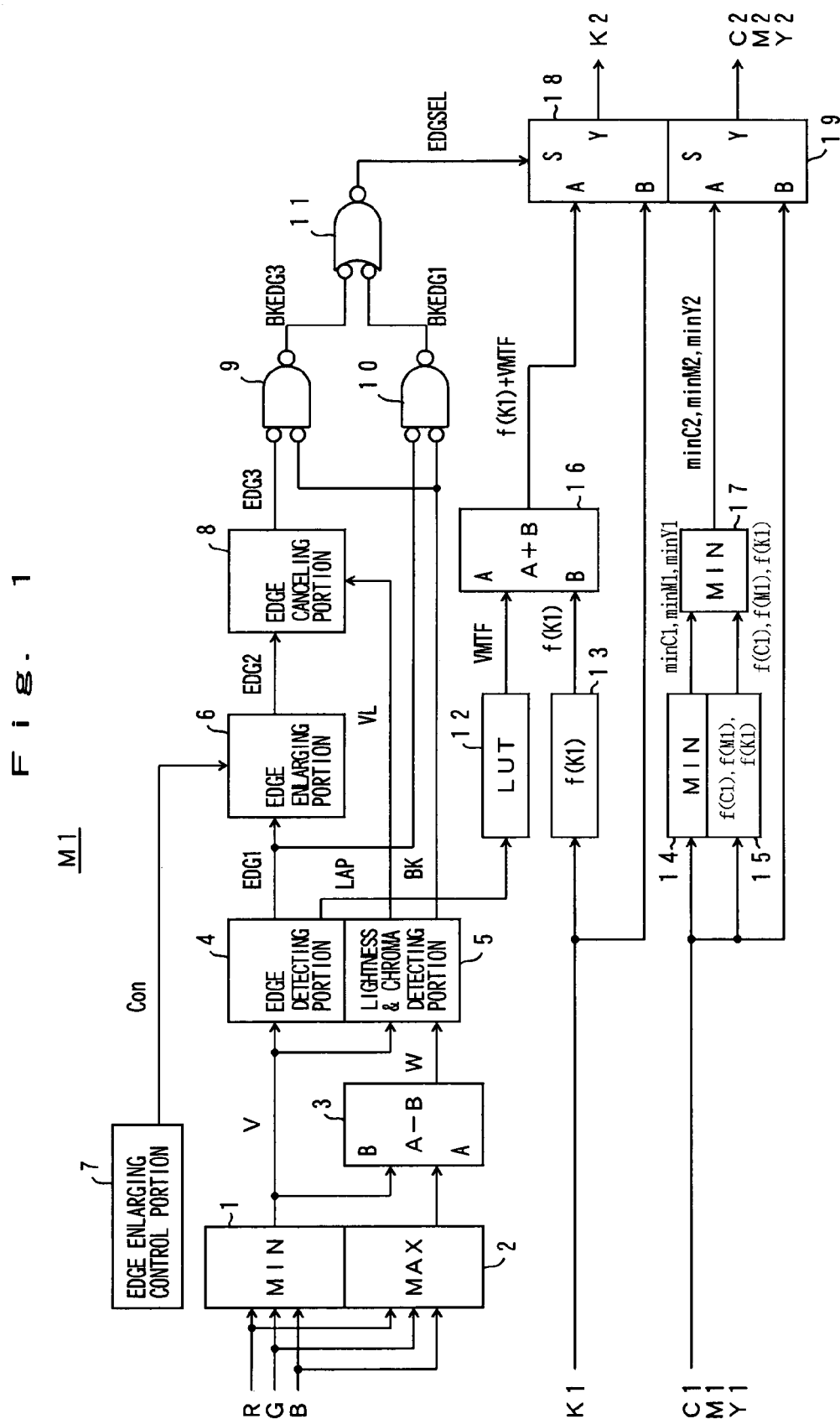
FIG. 1 is a block diagram showing a circuit of an image processing apparatus according to a first embodiment of the present invention.
Figure 8:
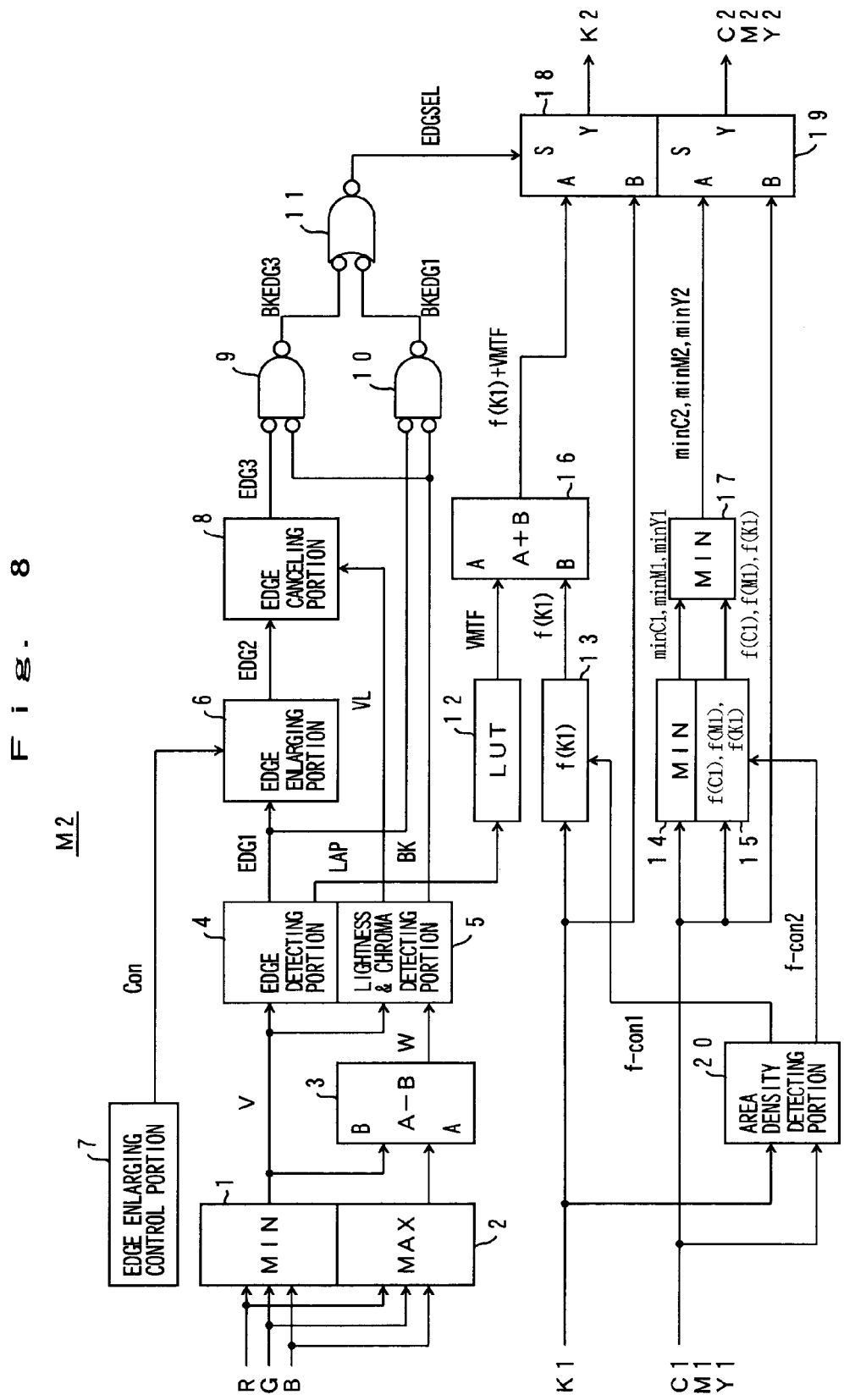
FIG. 8 is a block diagram showing a circuit of an image processing apparatus according to a second embodiment of the present invention.

An image processing apparatus M1 shown in FIG. 1 is mounted in a digital color copying machine for example. The color copying machine is equipped with an image reading device that includes a CCD image sensor and its drive system (not shown). In the image reading device, three primary colors of input image signals (color picture signals) R, G and B are obtained by scanning an original image as shown in FIG. 8. The input image signals R, G and B are given to a minimum value circuit 1 and a maximum value circuit 2 of the image processing apparatus M1.

In FIG. 1, the minimum value circuit 1 outputs the minimum value Min(R, G and B) of the input image signals R, G and B as a pseudo lightness V. The maximum value circuit 2 outputs the maximum value Max(R, G and B) of the input image signals R, G and B. A chroma signal generating circuit 3 outputs a difference [Max (R, G and B)–Min (R, G and B)] between the maximum Max (R, G and B) and the minimum Min (R, G and B) that is a pseudo lightness V, as a chroma signal W.

The pseudo lightness V is imparted to an edge detecting portion 4 and a lightness and chroma detecting portion 5. The edge detecting portion 4 includes a first order differential filter and a second order differential filter in the main scanning direction and the sub scanning direction made of 5×5 matrix. If the differential result is larger than a predetermined threshold level, the edge determination signal that is an output signal (hereinafter, simply referred to as "edge signal") EDG1 is set to the low level. The low level is the active level. If the edge signal EDG1 is the low level, it is considered to be an edge portion of the input image.

Figure 4:
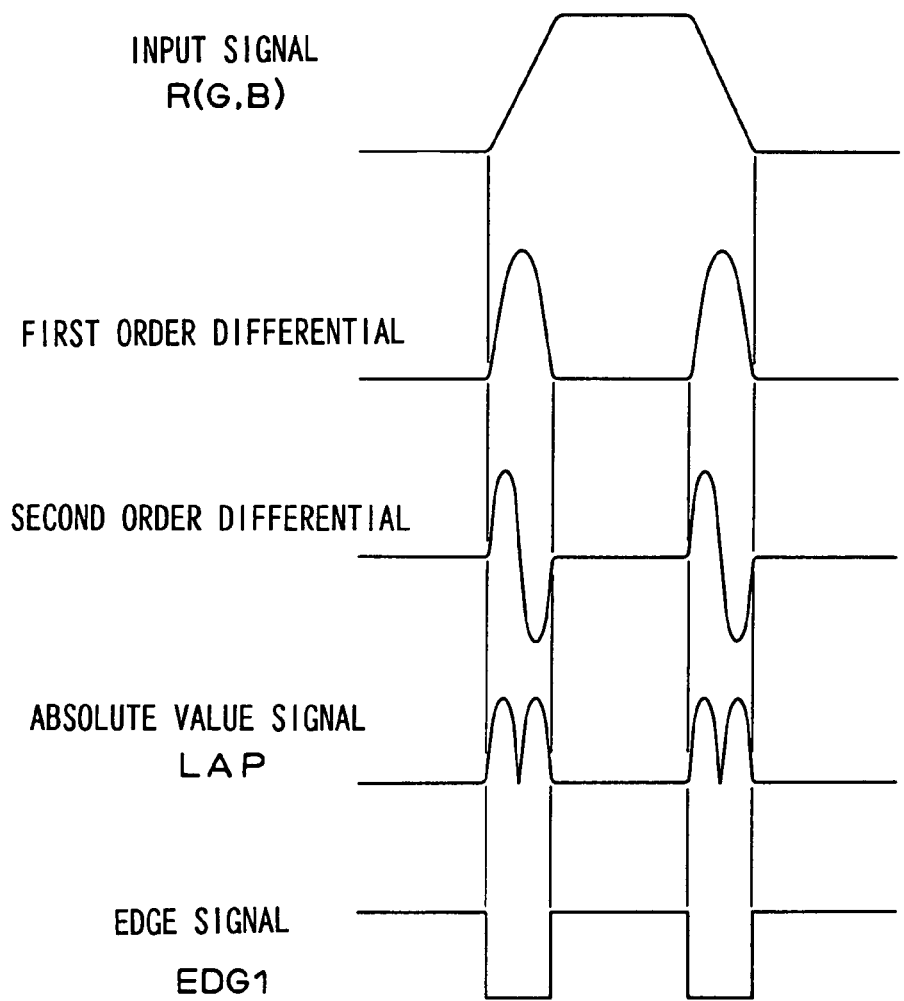
FIG. 4 shows a diagram showing waveforms of an input signal, internal signals and an output signal of an edge detecting portion of the image processing apparatus shown in FIG. 1.

The edge detecting portion 4 also output an absolute value signal LAP that is an output of the second order differential filter. Waveforms of the first order differential signal, the second order differential signal, the absolute value signal LAP and the edge signal EDG1 of the input image signal at a portion of a letter or a line are shown in FIG. 4.

The lightness and chroma detection portion 5 outputs a low lightness signal VL indicating that the lightness is low (blackish) when the above-mentioned pseudo lightness signal V is lower than a predetermined threshold value (Th1, e.g., 15–20 for 256 gradation steps). If the pseudo chroma signal W is lower than a predetermined threshold value (Th2), a monochromatic signal BK indicating to be a black and white picture.

Figure 2:
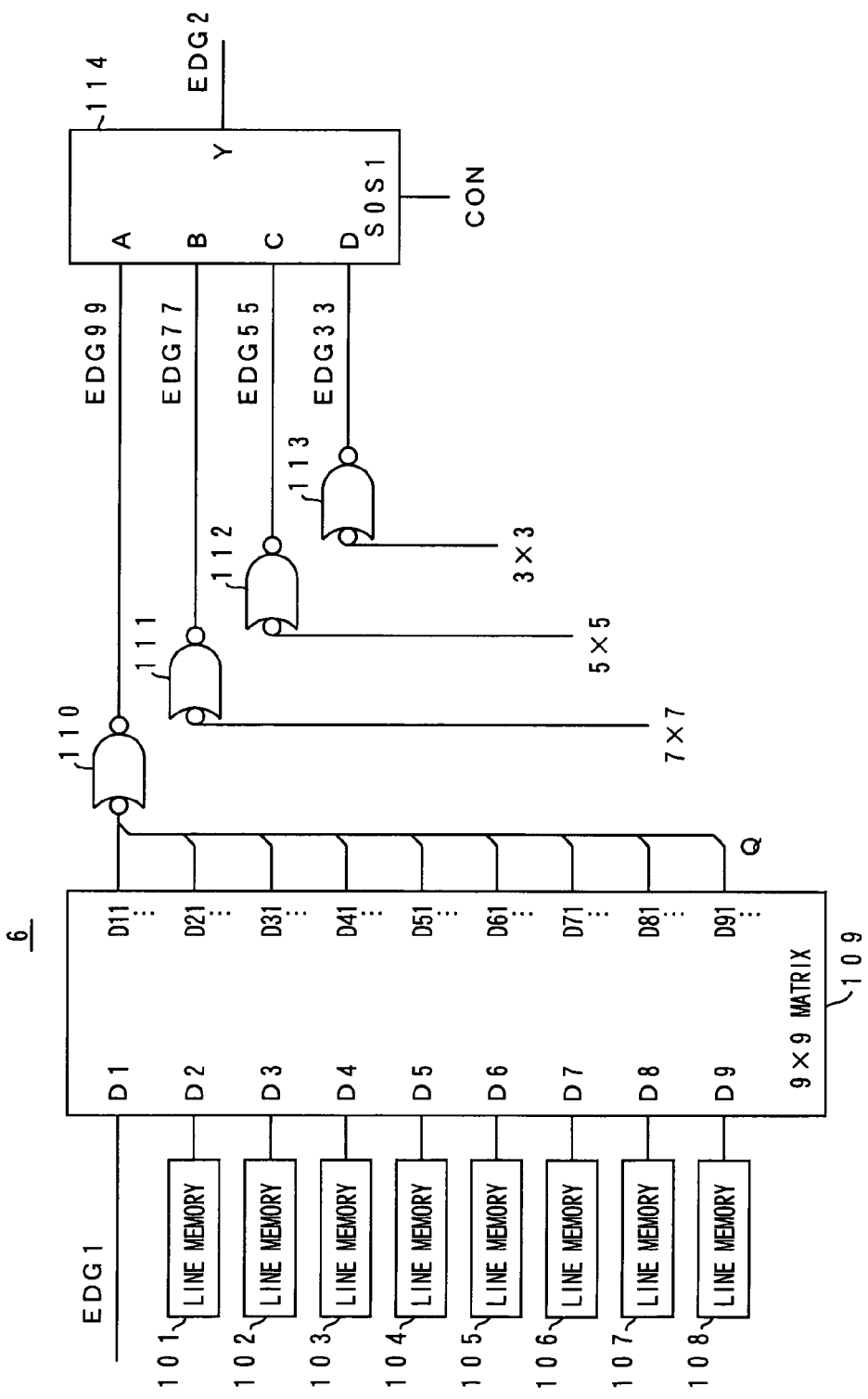
FIG. 2 is a schematic diagram showing an example of the edge enlarging portion of the image processing apparatus shown in FIG. 1.

The edge signal EDG1 is given to an edge enlarging portion 6. The edge enlarging portion 6 includes line memories 101–108, a 9×9 matrix circuit 109, negative logic OR circuits 110–113 and an enlarging level selecting circuit 114 as shown in FIG. 2. The line memories 101–108 are circuits for delaying the edge signal EDG1 by lines. This configuration can perform 9×9 matrix operation, so that the edge signal EDG1 can be enlarged by a width of four pixels at most in the main scanning direction and the sub scanning direction.

Figure 3:
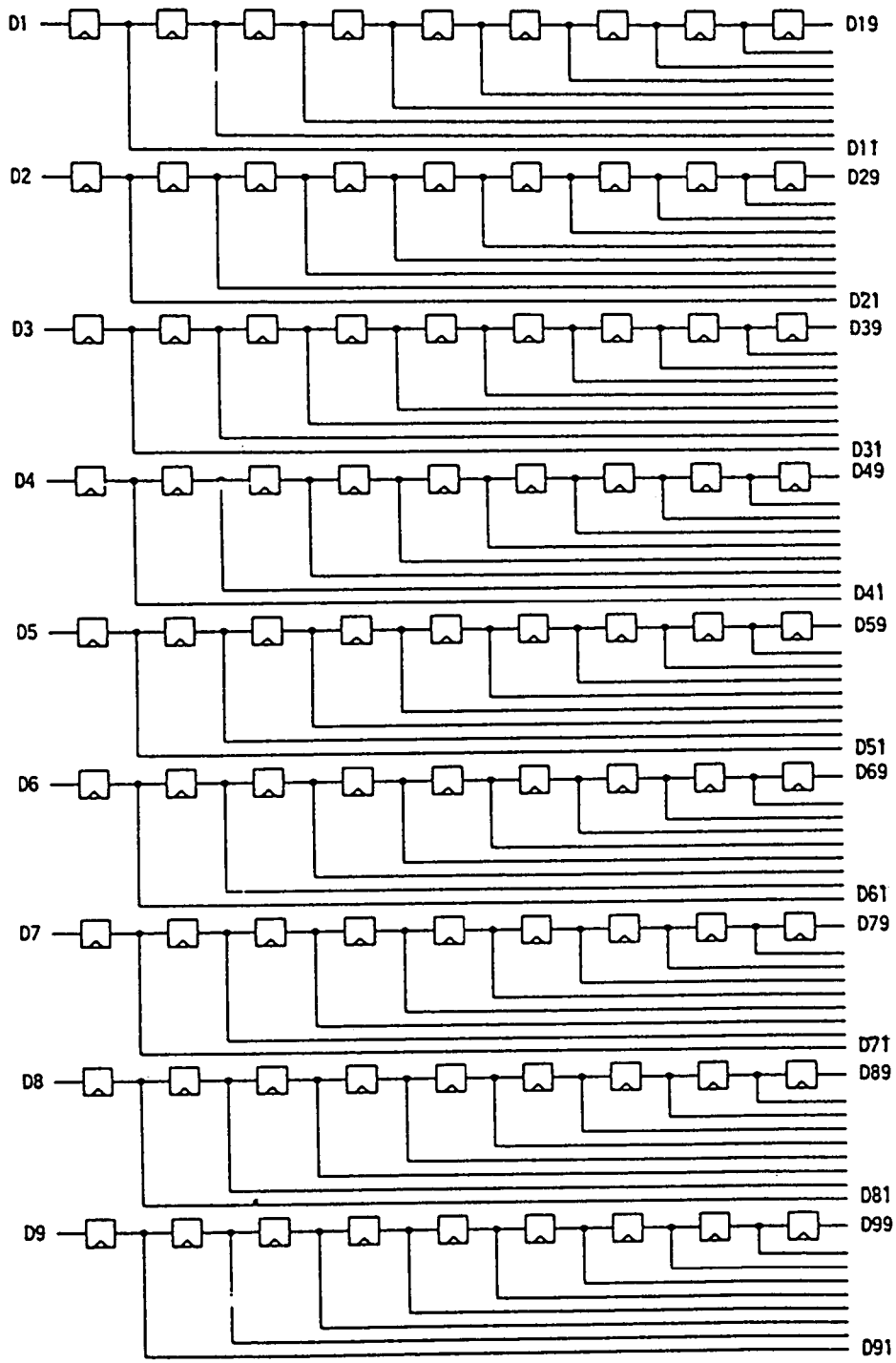
FIG. 3 is a diagram showing an example of 9×9 matrix circuit of the edge enlarging portion shown in FIG. 2.

The 9×9 matrix circuit 109 is constituted using a shift register group as shown in FIG. 3. From the input D1 that is a direct input of the edge signal EDG1, outputs D11–D19 that are delayed one by one pixel are obtained. From the input D2 that is a one line delayed input, outputs D21–D29 that are delayed one by one pixel are obtained. In the same way, from each of the nine inputs D3–D9 that are a 2–8 lines delayed input, outputs D31–D39, D91–D99 that are delayed one by one pixel are obtained. Thus, by operating a logical OR of the obtained 9×9 output pixel data by the negative logic OR circuit 110, an enlarged edge signal EDG99 is obtained that is a result of enlarging the edge signal EDG1 in the main scanning direction and the sub scanning direction by the width of four pixels.

In the configuration of the edge enlarging portion 6 shown in FIG. 2, the above-mentioned enlarged edge signal EDG99 is given to the enlarging level selecting circuit 114, whose selected signal is output as the enlarged edge signal EDG2 shown in FIG. 1 from the edge enlarging portion 6. Other enlarged edge signals EDG77, EDG55 and EDG33 of the other edge enlarging level are also given to the enlarging level selecting circuit 114. Two-bit enlarging level control signal Con (S0, S1) selects one of these four enlarged edge signals EDG99, EDG77, EDG55 and EDG33, which is output as an enlarged edge signal EDG2.

The enlarged edge signal EDG77, EDG55 and EDG33 are signals obtained by enlarging the edge signal EDG1 in the main scanning direction and the sub scanning direction by the width of 3 pixels, 2 pixels and 1 pixel using a 7×7, 5×5 and 3×3 matrix operation, respectively.

In FIG. 2, the negative logic OR circuits 111, 112 and 113 output operate logical OR's of 7×7, 5×5 and 3×3 pixel data, and output enlarged edge signals EDG77, EDG55 and EDG33. Though being not shown in FIG. 2 for avoiding complexity, 49 inputs of negative logic OR circuits 111 are connected to the 7×7 outputs D11–D17, D71–D77 of the 9×9 matrix circuit 109. In the same way, 25 inputs of negative logic OR circuit 112 are connected to the 5×5 outputs D11–D15, D51–D55 of the 9×9 matrix circuit 109, and the 9 inputs of the negative logic OR circuit 113 are connected to the 3×3 outputs D11–D13, D31–D33.

As mentioned above, the enlarging level control signal Con for selecting one of four enlarged edge signals EDG99, EDG77, EDG55 and EDG33 is given to the edge enlarging portion 6 by an edge enlarging control portion 7 shown in FIG. 1. The edge enlarging control portion 7 output four kinds of enlarging level control signals Con in accordance with an original mode signal supplied by a control portion. For example, if an original of letters is read, a color drift (or a color smear) due to a misregistration of black letters becomes conspicuous. Therefore, an output of a large enlarging matrix size, e.g., the enlarged edge signal EDG99 is selected. On the contrary, if an original having little black letters or lines such as an original of a picture is read, a small enlarging output, e.g., the enlarged edge signal EDG33 is selected. The description of "black letters or lines" means "black letters or black lines."

The enlarged edge signal EDG2 output from the edge enlarging portion 6 is given to an edge cancel portion 8 shown in FIG. 1. The edge cancel portion 8 performs a process in which the inner enlarged portion of the enlarged edge signal EDG2, i.e., the portion on the black line is remained (keeping the low level), the outer enlarged portion, that is a background portion is canceled to be the high level. By this process, the corrected enlarged edge signal EDG3 is generated and is output. The enlarged edge signal EDG2 that is output by the edge enlarging portion 6 includes a background portion of the black letters or the lines, and it is not preferable to perform the below-mentioned image processing to this portion.

The above-mentioned low lightness signal VL is used for the edge canceling process. As shown in FIG. 5, the low level of the enlarged edge signal EDG2 is canceled for the pixel whose low lightness signal VL is not the low level, i.e., the pixel of the high level (not active) and the lightness is high (not blackish). In other words, a corrected enlarged edge signal EDG3 is generated by negative logic AND operation of the enlarged edge signal EDG2 and the low lightness signal VL. In this way, the corrected enlarged edge signal EDG3 is obtained that is reset to the high level (not active) for the background (not blackish) pixels of the black letters or lines.

In FIG. 1, the corrected enlarged edge signal EDG3 is given to the negative logic AND gate 9, which outputs a black edge signal BKEDG3 that is an AND signal of the corrected enlarged edge signal EDG3 and the above-mentioned monochromatic signal BK. This black edge signal BKEDG3 indicates the enlarged edge area by the low level that has low lightness (blackish) and low chroma (black and white).

In addition, the edge signal EDG1 before being enlarged is also processed by logical AND with the monochromatic signal BK in the negative logic AND gate 10, and the second black edge signal BKEDG1 is output. This black edge signal BKEDG1 indicates a black edge area of low chroma (black and white) before enlarged by the low level. The black edge signals BKEDG3 and BKEDG1 are processed logical OR by the negative logic OR gate 11, which outputs an edge selection signal EDGSEL.

In FIG. 1, the absolute value signal LAP that is the output of the above-mentioned second order differential filter is given to a look-up table (LUT) 12 for VMTF conversion, and is converted into a lightness edge component signal VMTF there.

In a color copying machine, a RGB additive color image data obtained by scanning an original is converted to a CMY subtractive color image data. In this process or after the process, image data of four colors is generated that include the C, M and Y color components and K black component. A necessary image processing is performed on each of the generated image data C, M, Y and K, so as to become color image data C1, M1 and Y1, and black image data K1.

The black image data K1 obtained by the above-mentioned process is given to the black emphasizing circuit 13, which outputs black increasing image data f(K1). The black emphasizing circuit 13 has a conversion characteristic such as a characteristic curve CV1 shown in FIG. 6. Namely, as explained below, a decreased densities of the color image data C1, M1 and Y1 in the enlarged black edge area is compensated and the density of the black image data K1 is increased so as to keep the reproduced density of the printed black by performing a conversion of K1<f(K1). This characteristic curve CV1 is constituted by the look-up table for conversion for example, and a specific increasing characteristic is set in accordance with characteristics of ink or toner. The axis of ordinate in FIG. 6 indicates that larger value is high density.

The above-mentioned lightness edge component signal VMTF and the black increasing image data f(K1) is given to an adder circuit 16. The adder circuit 16 adds these input signals and outputs a black increased image data [f(K1)+VMTF] in which the edge of the black letters or lines is emphasized. Black increased image data [f(K1)+VMTF] is given to one input A of a selector 18. The other input of the selector 18 is supplied with a black image data K1 before increasing black density. In addition, a selection control input of the selector 18 is supplied with a selection signal EDGSEL mentioned above.

If the edge selection signal EDGSEL is the low level meaning an enlarged edge area, the selector 18 selects the edge enlarged black increased image data [f(K1)+VMTF] and outputs it as a final black image data K2. If the edge selection signal EDGSEL is the high level indicating an area that is not the enlarged edge area, an original black image data K1 is selected that is not processed by the black density increasing process and the edge emphasizing process, and the selected black image data K1 is output as a final black image data K2.

The color image data C1, M1 and Y1 are imparted to a minimum value circuit 14 and a color decreasing circuit 15.

The minimum value circuit 14 obtains the smallest value of data in the 5×5 or 3×3 pixel matrix, and outputs the minimum values minC1, minM1 and minY1 of the color image data C1, M1 and Y1, respectively. Though the minimum value circuits 14 are drawn as a unit in FIG. 1 to avoid the complexity, three minimum value circuits are provided for the color image data C1, M1 and Y1. The circuits 15, 17 and 19 explained blow have similar configurations.

The color decreasing circuit 15 decreases the density of the color image data C1, M1 and Y1 in accordance with a conversion characteristic shown by the characteristic curve CV2 in FIG. 7, and outputs color decreasing image data f(C1), f(M1) and f(Y1). FIG. 7 is an example of a cyan image data C1. In the same way as in FIG. 6, the axis of ordinate in FIG. 7 shows that the larger value indicates higher density, and a characteristic curve CV2 is constituted by a look-up table for conversion, for example. The decrease of the density of the color image data C1, M1 and Y1 is performed in the enlarged black edge area as mentioned below, so that a color smear due to a misregistration between color images can be not conspicuous.

Namely, since the density of the color image data C1, M1 and Y1 is decreased in the enlarged black edge area whose edge portion is enlarged, a larger misregistration in printing can be improved, so that the color drift due to the larger misregistration can be relieved. Thus, a color smear can be reduced in the edge of the black letters or lines. In addition, since the black image data K1 is increased along with the decrease of the densities of the color image data C1, M1 and Y1, steps of density cannot be generated.

The specific decreasing characteristic is preferably obtained by an experiment in accordance with a printing characteristic of the print reproducing characteristic of each color.

The minimum value minC1, minM1 and minY1 and color decreasing image data f(C1), f(M1) and f(Y1) of the above-mentioned color image data are given to a minimum value selecting circuit 17, so that minC1 and f(C1), minM1 and f(M1), or minY1 and f(Y1) are compared with each other for each color. The smaller value is selected to be output as the minimum value color image data minC2, minM2 and minY2 and given to one input A of the selector 19. The other input of the selector 19 is supplied with color image data C1, M1 and Y1 before being processed by such as color density decreasing. In addition, the selection control input of the selector 19 is supplied with the above-mentioned edge selection signal EDGSEL.

If the edge selection signal EDGSEL is the low level indicating an enlarged edge area, the selector 19 selects the minimum value color image data minC2, minM2 and minY2 that are values of decreased color density and the smaller value of the minimum values in the matrix, so as to output them as the final color image data C2, M2 and Y2. If the edge selection signal EDGSEL is the high level that indicates an area that is not enlarged edge area, the color image data C1, M1 and Y1 are selected before being processed by such as the color density decreasing and these data is output as the final color image data C2, M2 and Y2.

Using the black image data K2 and the color image data C2, M2 and Y2 that are obtained by the above-mentioned process, color printing is performed by a well-known printing engine.

According to the above-mentioned first embodiment, the image processing apparatus can support a high definition with a simple and inexpensive configuration, and can also increase a reproducing quality of the black letters or lines.

In addition, an edge portion of black letters or lines in the input image signal is detected so that the edge area can be enlarged, and the densities of the color components are decreased while the density of the black component is increased for the enlarged edge area. Therefore, the color smear due to a misregistration of the image of each color component in an edge portion can be suppressed.

Furthermore, the enlarging quantity of the edge area can be adjusted easily in accordance with a misregistration characteristic of the printer portion. In addition, the process of enlarging the edge area is performed using a single bit edge signal EDG1. The line memory for only one bit is necessary, having an advantage in cost.

Second Embodiment

FIG. 8 is a block diagram of image processing apparatus M2 according to the second embodiment of the present invention. In this embodiment, an area density detection portion 20 is added to the image processing apparatus M1 of the first embodiment shown in FIG. 1.

The area density detection portion 20 is supplied with black image data K1 and color image data C1, M1 and Y1. The area density detection portion 20 calculates an average density of a predetermined area (e.g., 3×3 matrix area) including a pixel to be corrected in accordance with each density of pixels in the area. Instead of the average density, a median of densities may be calculated.

In addition, each of the black emphasizing circuit 13 and the color decreasing circuit 15 includes plural conversion characteristics (e.g., conversion tables). Namely, for each of the conversion characteristics f(K1), f(C1), f(M1) and f(Y1) shown in FIGS. 6 and 7, plural conversion tables having different gradients of input image data vs. output image data are provided. The most appropriate conversion table is selected out of the plural conversion tables by a selection signal f_con1 or f_con2. The selection signals f_con1 and f_con2 are output by the above-mentioned area density detection portion 20 in accordance with the obtained average density (or the median density).

Thus, the quantity of increasing the black (K) density at a black edge portion and decreasing the color (C, M and Y) densities for various originals can be automatically corrected. For example, if the average density of the color (C, M and Y) image data is high, the gradation of characteristic curve CV2 shown in FIG. 7 is decreased. Namely, the decreasing extent of the color density is enlarged. Along with this process, the gradation of the characteristic curve CV1 shown in FIG. 6 is enlarged so as to enlarge the density increasing extent of the black (K) image data.

According to the second embodiment, the reproducing quality of the black letters and lines can be improved for various originals by automatically adjusting the characteristics (extent) of decreasing the color components and increasing the black component in accordance with the detected information of the area density detection portion 20.

Third Embodiment

Figure 9:
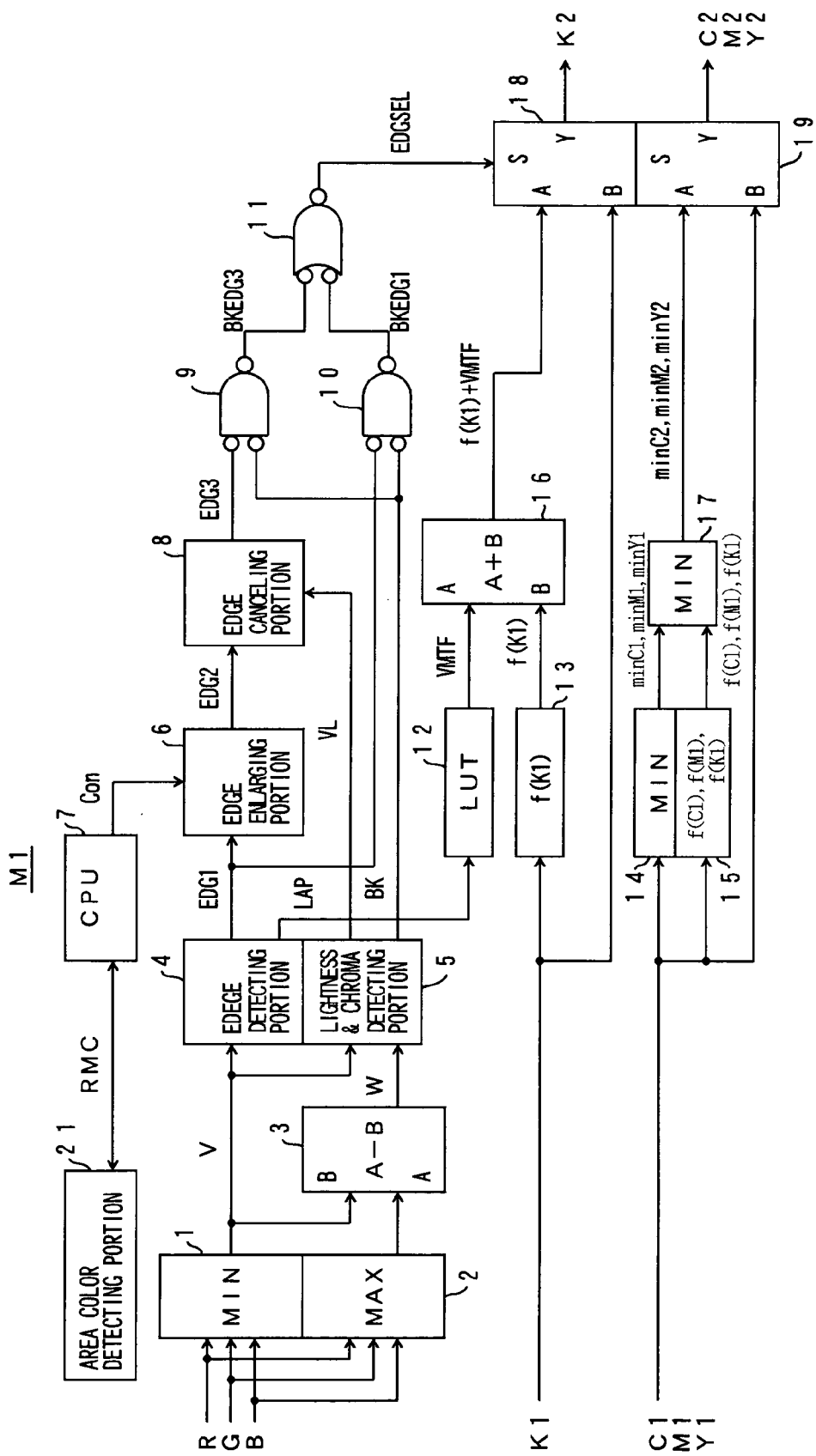
FIG. 9 is a block diagram showing a circuit of an image processing apparatus according to a third embodiment of the present invention.

FIG. 9 is a block diagram of the image processing apparatus M3 according to the third embodiment of the present invention. In this embodiment, an area color detection portion 21 and a CPU 7 are used instead of the edge enlarging control portion 7 of the image processing apparatus M1 of the first embodiment shown in FIG. 1. Other configuration is the same.

In FIG. 9, the area color detection portion 21 detects a ratio of monochrome and color for each block area of the input image. The CPU 7 controls the enlarging quantity of the edge area by the edge enlarging portion 6 in accordance with the ratio of monochrome and color. In order to control the edge increasing quantity, an appropriate edge increasing quantity is set out of plural edge area increases such as a four pixel edge area increase by 9×9 matrix, a three pixel edge area increase by 7×7 matrix, a two pixel edge area increase by 5×5 matrix and a one pixel edge area increase by 3×3 matrix.

For example, in a block area in which the monochrome has a large proportion, the edge increasing quantity is set to large like the four pixel area increase or the three pixel area increase. Thus, the color drift relieving effect in the edge portion becomes larger for the area of the black letters or lines. In the block area in which the monochrome has a small proportion, the edge increasing quantity is set to small like the one pixel area increase or the zero pixel area increase. Thus, for a color picture area for example, a natural picture image is obtained without unnecessary color drift prevention process.

According to the process explained above, a color drift in an edge portion becomes inconspicuous do that the reproducing quality of the black letters or lines is increased. As a block area, various sizes of areas can be used For example, the original can be divided into plural block areas. In addition, the entire original can be one block area.

Thus, the inner black edge area can be enlarged in the inward direction of the black letters or lines, and the image densities of the C, M and Y color components in the enlarged inner black edge area are decreased and the image density of the K black component is increased to as to compensate the decrease.

Figure 10:
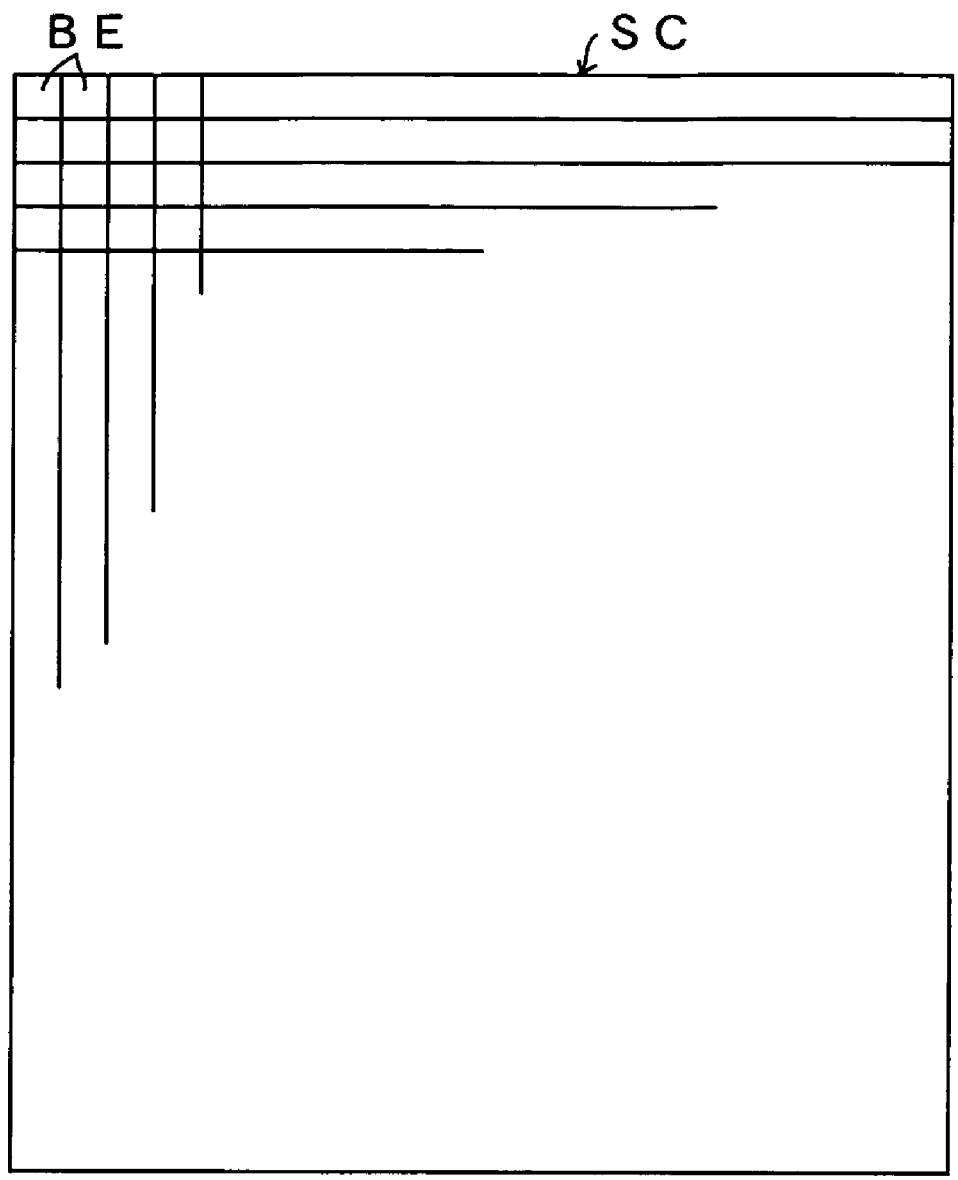
FIG. 10 is a diagram showing a division of an original image in an area color detecting portion.

In FIG. 10, the original SC is divided into plural block area BE by the area color detection portion 21 after the image thereof is read by the image reader. Therefore, in this case, the number of the block area BE is decided in accordance with the size of the original SC. A memory area (not shown) for deciding a ratio of monochrome and color is secured in accordance with the number of the block area BE.

The size of one block area BE is 512×512 pixels, for example. In this case, if the definition is 400 dpi, the size is approximately 3×3 cm. If the block area BE is 1024×1024 pixels and the definition is 400 dpi, the size is approximately 6×6 cm.

The area color detection portion 21 calculates chroma data for each pixel in each block area BE. If the chroma data of a pixel is larger than a predetermined threshold value (Th3), the pixel is determined to be a color pixel. Pixels except the color pixel are monochromatic pixels. In each block area BE, the number of color pixels or monochromatic pixels is counted. The number of color pixels or monochromatic pixels, a proportion of the number of color pixels or monochromatic pixels in the entire number of pixels, or the ratio of the color pixels and monochromatic pixels is determined as a monochrome and color ratio RMC. The determined monochrome and color ratio RMC is output to the CPU 7.

Figure 11:
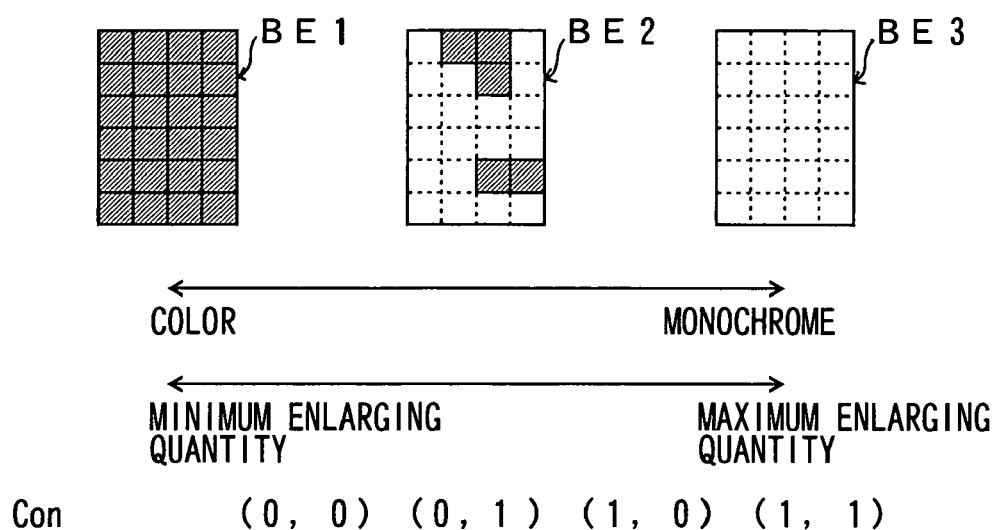
FIG. 11 is a diagram for explaining a relationship between a monochromatic/color ratio of a block area and an edge increasing quantity.

The CPU7 generates the enlarging level control signal Con (S0, S1) in accordance with the monochrome and color ratio RMC, and output the signal to the edge enlarging portion 6. For example as shown in FIG. 11, if there are only color pixels, the enlarging level control signal Con is set to (0,0). If there are only monochromatic pixels, the enlarging level control signal Con is set to (1,1). If there are color pixels and monochromatic pixels, the enlarging level control signal Con is set to (0,1) or (1,0).

The edge increasing quantity is controlled by the edge enlarging portion 6 in accordance with the enlarging level control signal Con.

If the edge enlarging portion 6 determines an original of letters according to the enlarging level control signal Con, the output of a large enlarging matrix size, e.g., the enlarged edge signal EDG99 is selected since a color drift (or a color smear) due to a misregistration of the black letters becomes conspicuous. On the contrary, if the original has little black letters or lines such as an original of a picture, the output of a small enlarging matrix size, e.g., the enlarged edge signal EDG33 is selected.

Though the enlarging level control signal Con is set for each divided block area BE in the embodiment explained above, the original SC can be regarded as one block area and one enlarging level control signal Con can be set for the entire original. In this case, it is decided whether the block area BE is a color block area or not in each block area BE.

Namely, in each block area BE, if the number of the color pixels is larger than a predetermined threshold level (Th4), the block area BE is decided to be a color block area. A block area BE except the color block area is a monochromatic block area. The number of the color block area or the monochromatic block area is counted. The ratio is determined as a monochrome and color ratio RMC. According to the monochrome and color ratio RMC, the edge increasing quantity is controlled for the entire original SC by the edge enlarging portion 6.

The size of the block area BE can be changed variously.

If the size of the block area BE is reduced, the image quality is improved, but more process time is required. In addition, various methods can be adopted for determining a color area or a monochromatic area, and for determining monochrome and color ratio RMC.

The relationship between monochrome and color ratio RMC and the enlarging level control signal Con is not always proportional. This relationship can be varied in accordance with a copy mode set in the color copying machine. For example, if the copy mode is set to the picture mode, the major portion or the principal portion of the original SC is probably a picture, the edge increasing quantity is controlled to zero.

Concerning the portion for detecting the monochrome and color ratio RMC, a part of the function is conventionally known as an automatic color detection system (ACS).

According to the third embodiment explained above, the simple configuration with low cost can support a high definition and the reproducing quality of black letters or lines can be increased. In addition, the enlarging quantity of the edge area is controlled in accordance with the monochrome and color ratio, so that an appropriate enlarging quantity can be set in accordance with the state of image. Furthermore, it can be adjusted easily in accordance with the characteristics of misregistration of the printer portion.

Furthermore, the edge portion of the black letters or lines in the input image signal is detected, the edge area is enlarged, and the density of color component is decreased while the density of the black component is increased for the enlarged edge area, so that a color smear due to the misregistration of images of the color components is suppressed.

In the image processing apparatus M2 of the above-mentioned second embodiment, the edge enlarging control portion 7 can be replaced with the area color detection portion 21 and the CPU7 of the third embodiment, so as to make the configuration having the feature of the third embodiment.

Though the edge increasing quantity has four levels in the embodiment explained above, it can have less than or more than four levels. The enlarging level control signal Con can be various forms. In addition, the configuration, the circuit, the contents or the sequence of the process, and the process timing of the whole or each portion of the image processing apparatus M1–M3 can be appropriately changed or modified within the scope of the present invention.

What is claimed is:

1. An image processing apparatus for processing image data indicating a density of each pixel of an image, the apparatus comprising:
   an edge detecting portion for detecting an edge area in the image in accordance with the image data;
   an edge enlarging portion for enlarging the edge area detected by the edge detecting portion; and
   a density correcting portion for increasing or decreasing the density of the image data of the edge area enlarged by the edge enlarging portions,
   wherein the image data includes a black component and color components, and the density correcting portion increases at least a density of the black component.

2. The image processing apparatus according to claim 1, wherein the edge detecting portion includes a first order differential filter for operating the first order differential of the image data so as to determine the edge area whose first order differential is larger than a predetermined value.

3. The image processing apparatus according to claim 1, wherein the image data includes a black component and color components, and the density correcting portion increases a density of the black component and decreases the densities of the color components.

4. The image processing apparatus according to claim 1, further comprising a controller for controlling the enlarging degree in the edge enlarging portion.

5. The image processing apparatus according to claim 4, wherein the controller indicates the enlarging degree in accordance with a kind of the image, and the edge enlarging portion changes the enlarging degree in accordance with the indication of the controller.

6. The image processing apparatus according to claim 5, wherein one kind of the image is a monochromatic image and the other kind is a color image.

7. The image processing apparatus according to claim 1, wherein the edge enlarging portion enlarges the edge area inside the image but does not enlarge outside the image.

8. The image processing apparatus according to claim 7, wherein the edge enlarging portion decides the inside and the outside of the image in accordance with the lightness component of the image data.

9. The image processing apparatus according to claim 1, wherein the density correcting portion includes a density detecting portion for calculating an average density of the image data of the plural pixels included in a predetermined area, and a correcting portion for correcting the degree of increasing or decreasing each color component in accordance with the average density calculated by the density detecting portion.

10. The image processing apparatus according to claim 1, wherein the density correcting portion includes a density detecting portion for calculating a median density of the image data of the plural pixels included in a predetermined area, and a correcting portion for correcting the degree of increasing or decreasing each color component in accordance with the median density calculated by the density detecting portion.

11. An image processing apparatus for processing image data indicating a density of each pixel of an image, the apparatus comprising:
    an edge detecting portion for detecting an edge area in the image in accordance with the image data;
    an edge enlarging portion for enlarging the edge area detected by the edge detecting portion;
    a modifying portion for modifying the edge area enlarged by the edge enlarging portion in accordance with the lightness information thereof; and
    a density correcting portion for increasing or decreasing the density of the image data of the edge area modified by the modifying portion.

12. The image processing apparatus according to claim 11, wherein the edge detecting portion includes a first order differential filter for operating the first order differential of the image data so as to determine the edge area whose first order differential is larger than a predetermined value.

13. The image processing apparatus according to claim 11, wherein the image data includes a black component and color components, and the density correcting portion increases a density of the black component and decreases the densities of the color components.

14. The image processing apparatus according to claim 11, further comprising a controller for controlling the enlarging degree in the edge enlarging portion.

15. The image processing apparatus according to claim 14, wherein the controller indicates the enlarging degree in accordance with a kind of the image, and the edge enlarging portion changes the enlarging degree in accordance with the indication of the controller.

16. The image processing apparatus according to claim 15, wherein one kind of the image is a monochromatic image and the other kind is a color image.

17. The image processing apparatus according to claim 11, wherein the modifying portion cancel the enlarged edge area enlarged in the outside of the image by the edge enlarging portion.

18. The image processing apparatus according to claim 17, wherein the modifying portion decides the inside and the outside of the image in accordance with the lightness component of the image data.

19. The image processing apparatus according to claim 11, wherein the density correcting portion includes a density detecting portion for calculating an average density of the image data of the plural pixels included in a predetermined area, and a correcting portion for correcting the degree of increasing or decreasing each color component in accordance with the average density calculated by the density detecting portion.

20. The image processing apparatus according to claim 11, wherein the density correcting portion includes a density detecting portion for calculating a median density of the image data of the plural pixels included in a predetermined area, and a correcting portion for correcting the degree of increasing or decreasing each color component in accordance with the median density calculated by the density detecting portion.

21. An image processing method for processing image data indicating a density of each pixel of an image, the method comprising the steps of:
    detecting an edge area in the image in accordance with the image data;
    enlarging the edge area detected by the edge detecting portion; and
    correcting the density by increasing or decreasing the density of the image data of the edge area enlarged by the edge enlarging portion,
    wherein the image data includes a black component and color components, and the density correcting portion increases at least a density of the black component.

22. The image processing method according to claim 21, wherein the image data including a black component and color components, and the density correcting step includes increasing a density of the black component and decreasing the densities of the color components.

23. The image processing method according to claim 21, further includes the step of controlling the enlarging degree in the edge enlarging step.

24. The image processing method according to claim 23, wherein the controlling step includes the step of indicating the enlarging degree in accordance with a kind of the image, and the edge enlarging step includes changing the enlarging degree in accordance with the indication of the controlling step.

25. The image processing method according to claim 24, wherein one kind of the image is a monochromatic image and the other kind is a color image.

26. The image processing method according to claim 21, wherein the edge enlarging step includes the step of enlarging the edge area not outside the image but inside the image.

27. The image processing method according to claim 26, wherein the edge enlarging step includes the step of deciding the inside and the outside of the image in accordance with the lightness component of the image data.

28. The image processing method according to claim 21, wherein density correcting step includes the steps of detecting density by calculating an average density of the image data of the plural pixels included in the predetermined area, and changing the degree of increasing or decreasing each color component in accordance with the average density calculated by the density detecting step.

29. The image processing method according to claim 21, wherein density correcting step includes the steps of detecting density by calculating a median density of the image data of the plural pixels included in a predetermined area, and changing the degree of increasing or decreasing each color component in accordance with the median density calculated by the density detecting step.

* * * * *

UNITED STATES PATENT AND TRADEMARK OFFICE
CERTIFICATE OF CORRECTION

PATENT NO. : 7,003,152 B1 Page 1 of 1
APPLICATION NO. : 09/484540
DATED : February 21, 2006
INVENTOR(S) : Kenichi Sawada It is certified that error appears in the above-identified patent and that said Letters Patent is hereby corrected as shown below:

In Claim 1, column 10, line 59, change "portions" to --portion--; and

In Claim 28, column 13, line 6, change "the predetermined area" to --a predetermined area --.

Signed and Sealed this

Fourteenth Day of November, 2006

JON W. DUDAS
*Director of the United States Patent and Trademark Office*